(12) United States Patent
Wettling et al.

(10) Patent No.: US 6,939,943 B2
(45) Date of Patent: Sep. 6, 2005

(54) METHOD FOR DEACTIVATING AND RECOVERING BORON TRIFLUORIDE WHEN PRODUCING POLYISOBUTENES

(75) Inventors: Thomas Wettling, Ekeren (BE); Dirk Borchers, Kapellen (BE); Wim Verrelst, Edegem (BE); Hans Peter Rath, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 146 days.

(21) Appl. No.: 10/432,045

(22) PCT Filed: Nov. 16, 2001

(86) PCT No.: PCT/EP01/13269

§ 371 (c)(1),
(2), (4) Date: May 19, 2003

(87) PCT Pub. No.: WO02/40553

PCT Pub. Date: May 23, 2002

(65) Prior Publication Data

US 2004/0030076 A1 Feb. 12, 2004

(30) Foreign Application Priority Data

Nov. 17, 2000 (DE) .......................................... 100 57 318
Jun. 7, 2001 (DE) .......................................... 101 27 818

(51) Int. Cl.[7] ................................................. C08F 6/08
(52) U.S. Cl. ...................... 528/481; 528/496; 528/499; 526/209; 526/237
(58) Field of Search ............................... 528/481, 496, 528/499; 526/209, 237, 348.7

(56) References Cited

U.S. PATENT DOCUMENTS 4,152,499 A * 5/1979 Boerzel et al. ............. 525/381
5,973,219 A * 10/1999 Colman et al. ............. 585/525

FOREIGN PATENT DOCUMENTS

| DE | 2702604 | 7/1978 |
|----|---------|--------|
| EP | 0 145 235 | 6/1985 |
| EP | 0 322 241 | 6/1989 |
| EP | 481 297 | 10/1990 |
| EP | 628575 | 12/1994 |
| EP | 0 742 191 | 11/1996 |
| EP | 0 896 967 | 2/1999 |
| WO | 93/10063 | 5/1993 |
| WO | 96/40808 | 12/1996 |
| WO | 99 31151 | 6/1999 |

OTHER PUBLICATIONS

Imre Puskas: "The nature of the double bond in low molecular weight polyisobutylenes and 'polybutene' copolymers" J. Polymer. Sci., Symposium No. 56, pp. 191–202 1976.

* cited by examiner

*Primary Examiner*—Fred Teskin
(74) *Attorney, Agent, or Firm*—Oblon, Spivak, McClelland, Maier & Neustadt, P.C.

(57) ABSTRACT

The invention relates to a method for deactivating and recovering boron trifluoride when producing polyisobutenes by means of cationic polymerization of isobutene or hydrocarbon streams containing isobutene in the liquid phase in the presence of boron trifluoride or in the form of a boron trifluoride catalyst complex. The catalyst complex is separated, essentially in the liquid phase, from the reactor discharge. The method comprises the following steps: a) removing from the polymerization reactor at −60 to 020 C., methanol, ethanol or a mixture of methanol and ethanol in such a quantity that an alcohol phase rich in boron trifluoride is formed; b) separating the alcohol phase according to (a) and, (c) optionally recycling the boron trifluoride of the alcohol phase obtained from (b) to the method in a suitable manner.

18 Claims, No Drawings

METHOD FOR DEACTIVATING AND RECOVERING BORON TRIFLUORIDE WHEN PRODUCING POLYISOBUTENES

BACKGROUND OF THE INVENTION

1. Field of the Invention

The present invention relates to a process for deactivating and recovering boron trifluoride in the preparation of polyisobutenes by cationic polymerization of isobutene or isobutene-containing hydrocarbon streams in the liquid phase in the presence of boron trifluoride as such or in the form of a boron trifluoride catalyst complex, in which the catalyst complex is separated as a substantially liquid phase from the discharge from the reactor.

2. Description of the Background

High molecular weight polyisobutenes having weight average molecular weights ($M_w$) of up to several hundred thousand Dalton have long been known, and their preparation is described, for example, in H. Guterbock: Polyisobutylen und Mischpolymerisate, Springer Verlag, Berlin 1959 pages 77 to 104. The highly reactive polyisobutenes which as a rule have weight average molecular weights of from 500 to 50000 Dalton and a high content of terminal double bonds, i.e. vinylidene groups, preferably substantially more than 60 mol %, should be distinguished from these conventional polyisobutenes.

Such highly reactive polyisobutenes are used as intermediates for the preparation of additives for lubricants and fuels, as described, for example, in DE-A 27 02 604. For the preparation of these additives, polyisobutene/maleic anhydride adducts, in particular polyisobutenylsuccinic anhydrides, are first produced by reacting the terminal double bonds of the polyisobutene with maleic anhydride and are then reacted with specific amines to give the final additive. The proportion of terminal vinylidene groups in the molecule is one of the most important quality criteria for this polyisobutene type since, in the adduct formation with maleic anhydride, mainly the terminal vinylidene groups react whilst, depending on their position in the macromolecule, the double bonds present further toward the interior of the macromolecules do not react or react to a substantially smaller extent, without the addition of suitable activators.

The generation of the terminal vinylidene groups and the isomerization of the terminal double bonds in the isobutene macromolecules to give internal double bonds are described, for example, in the article by Puskas et al., J. Polymer Sci.: Symposium No. 56, 191 (1976) or EP-A 628 575. The protonations, deprotonations and rearrangement reactions taking place there are equilibrium reactions in which the formation of more highly alkyl-substituted cations is thermodynamically favored. Said reactions are as a rule promoted by traces of acid, in particular by the catalyst of the polymerization itself, which is usually a Lewis acid catalyst.

A further quality criterion for polyisobutenes having the said intended use is their number average molecular weight ($M_n$). Number average molecular weight is a quantity which indicates the average molecular size present in the product of the polymerization. In general, polyisobutenes having a number average molecular weight of from 200 to 50000, preferably from 200 to 5000, in particular from 500 to 3000 and especially from 500 to 2500, Dalton are used.

The molecular weight distribution (dispersity, D) of the polyisobutene macromolecules is also a quality criterion for said purpose since, the broader it is, i.e. the greater the scatter of the molecular weights of the polyisobutene macromolecules about a mean value, often the less tailored are the products to a specific property.

A person skilled in the art is familiar with a number of processes for the preparation of highly reactive polyisobutenes from isobutene which have number average molecular weights and dispersities which meet said requirements and for which boron trifluoride is used as a catalyst.

Boron trifluoride is used predominantly in the form of donor complexes, in particular with water, alcohols, phenols, carboxylic acids, carboxylic anhydrides, hydrogen fluoride, ethers or mixtures of these compounds. Boron trifluoride, as such or in the form of said complexes, is a catalyst which is extremely effective even at low temperatures (cf. for example DE-A 27 02 604, EP-A 145 235 or EP-A 322 241).

If it is therefore intended to stop the boron trifluoride-catalyzed polymerization of isobutene after a defined conversion and/or a defined selectivity with respect to the macromolecular products has been reached, the boron trifluoride must as a rule be rapidly and completely deactivated. This deactivation may consist in decomposing the boron trifluoride, for example in hydrolyzing it with sodium hydroxide solution, or in complexing it with stronger donors in order to remove it from the reaction.

DE-C 40 33 196 states that the reaction can be stopped with ammonia or with from 5 to 50% strength by weight aqueous sodium hydroxide solution. However, sodium or ammonium salts which form thereby cannot be completely separated off from the reaction product polyisobutene, even by washing several times with water, and present problems in the applications described above, generally even in amounts of less than 10, often of even less than 0.1 ppm.

According to DE-A 43 06 384, the deactivation of the boron trifluoride can be carried out using water, alcohols, acetonitrile, ammonia or aqueous solutions of mineral bases, such as alkali metal and alkaline earth metal hydroxide solutions, or with solutions of carbonates of these metals.

The hydrolytic processes under aqueous conditions for deactivating the boron trifluoride all lead to waste waters which are problematic owing to their content of inorganic fluoride of course, the boron trifluoride also cannot be recycled economically for re-use in the process by this method. Since the processes of this type for the preparation of polyisobutenes generally have to be carried out at low temperatures in order to be sufficiently selective, the aqueous hydrolysis of the reactor discharge usually has to be carried out with heated water in order to be sufficiently rapid and complete and to avoid the formation of ice in the discharge. In these generally short heating-up phases, however, undesirable by-products may form, i.e. the overall selectivity of the reaction decreases. Particularly for industrial processes, however, this procedure also means that some of the energy consumed for reaching the low reaction temperature is lost. With the use of water, a larger or smaller amount of corrosive hydrofluoric acid is also virtually always formed, necessitating the use of high-quality and hence usually expensive materials, in particular special steels for the construction of the downstream parts of the plant.

The deactivation of the boron trifluoride with the aprotic acetonitrile (cf. for example EP-A 145 235) takes place rapidly. However, the toxic acetonitrile is generally used in excess and is readily water-soluble, so that large amounts of problematic waste water result during working-up.

WO-A 99/31151 discloses that boron trifluoride can be separated from the reaction mixture of the isobutene polymerization in the form of an isopropanol complex, and the boron trifluoride can be made available again for the reaction in this way. In order for this separation to take place, not more than 2% by weight of isobutene may be present in the reaction mixture. In practice, however, this content leads to products of reduced reactivity in the reaction of isobutene to give polyisobutenes having number average molecular weights of more than 1000, so that low isobutene contents are preferably avoided in this way and in these cases unconsumed isobutene is removed from the reaction mixture at the end of the reaction with considerable additional technical effort.

SUMMARY OF THE INVENTION

It is an object of the present invention to provide an improved process for deactivating and recovering boron trifluoride from reaction mixtures as obtained in the preparation of highly reactive polyisobutenes from isobutene with the use of boron trifluoride as a catalyst.

We have found that this object is achieved by a process for deactivating and recovering boron trifluoride in the preparation of polyisobutenes by cationic polymerization of isobutene or isobutene-containing hydrocarbon streams in the liquid phase in the presence of boron trifluoride as such or in the form of a boron trifluoride catalyst complex, the catalyst complex being separated as a substantially liquid phase from the discharge from the reactor, wherein a) methanol, ethanol or a mixture of methanol and ethanol is added to the discharge from the polymerization reactor at from −60 to 0° C. in an amount such that a boron trifluoride-rich alcohol phase separates out, b) the alcohol phase according to (a) is separated off and c) the boron trifluoride of the alcohol phase according to (b) is, if desired, recycled to the process in a suitable manner.

DETAILED DESCRIPTION OF THE PREFERRED EMBODIMENTS

The use of methanol is particularly advantageous when carrying out the novel process.

The alcohols methanol, ethanol and their mixtures with one another which are used according to the invention for deactivating and recovering boron trifluoride, are referred to herein as alkanols for short.

Here, terminal vinylidene groups or terminal double bonds are understood as meaning those double bonds whose position in the polyisobutene macromolecule is described by the formula I

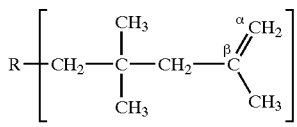

I where R is the remaining part of the polyisobutylene macromolecule. The type and the amount of the double bonds present can be determined with the aid of $^{13}$C-NMR spectroscopy, the two carbon atoms of the terminal double bond which are indicated by α and β in the formula I being identifiable in the $^{13}$C-NMR spectrum by their signal at the chemical shifts of 114.4 and 143.6, respectively, relative to tetramethylsilane. The proportion of terminal double bonds relative to other types of double bonds is determined by expressing the peak areas of the individual olefin signals in each case as a ratio of the total area integral of the olefin signals.

For the preparation of highly reactive polyisobutenes from isobutene in the presence of boron trifluoride, usually either the required amount of preformed boron trifluoride complex solution or suspension is dispersed in the isobutene or alternatively the catalyst is produced in situ by passing gaseous boron trifluoride into the isobutene and the complexing agent for the boron trifluoride. The catalytically active system comprising boron trifluoride and the complexing agent, which is formed by one of said routes, is referred to below as catalyst system.

Suitable complexing agents for the boron trifluoride in the reaction of isobutene to give highly reactive polyisobutenes are alcohols, preferably secondary alcohols, with for example 1 to 4 carbon atoms and in particular, independently of one another, isopropanol and sec-butanol (cf. EP-A 628 575). A dialkyl ether (cf. U.S. Pat. No. 5,408,018) and in particular a dialkyl ether which has at least one tertiary alkyl group or at least one secondary alkyl group can also be added as a further complexing agent to these catalyst systems. Such catalyst systems are disclosed in WO-A 99/64482, which is hereby wholly incorporated by reference with respect to the catalyst complexes.

In general, the same molar amount, preferably from 2.5 to 1.05, in particular from 2 to 1.25, times the molar amount, based on boron trifluoride used, of such alcohols and/or ethers as complexing agents is present.

Usually, the catalyst system is used in amounts of from 0.05 to 1% by weight, based on the weight of the isobutene used. The gross reaction rate and the molecular weight are dependent as a rule on the amount of catalyst system used, but especially on the molar ratio of the catalyst used to isobutene used.

Pure isobutene as well as mixtures of isobutene with other hydrocarbons can be used as isobutene-containing starting material (referred to below as isobutene feedstock) in the synthesis step preceding the deactivation of the boron trifluoride, the isobutene content of such mixtures expediently being not less than 5% by weight. Preferably, hydrocarbon mixtures having a high isobutene content and a very low butadiene content are used, for example refined fraction I, a partially hydrogenated $C_4$ stream from a steam cracker, a $C_4$ stream from the fluid catalyst cracking of the refineries or a $C_4$ stream from an isobutane dehydrogenation.

The isobutene feedstock can be reacted in the presence of the catalyst system in one or more inert solvents to give the polyisobutene. Suitable solvents, individually or as a mixture with one another, are saturated hydrocarbons, for example n-butane, n-pentane, n-hexane, isooctane or cyclohexane, halogenated hydrocarbons, such as methylene chloride, chloroform and other halohydrocarbon compounds having suitable melting points and boiling points. If isobutene-containing hydrocarbon steams are used as the isobutene feedstock, the hydrocarbons contained therein which are inert under the reaction conditions perform the function of the solvent.

The isobutene feedstock may contain small amounts of impurities, such as water, acetaldehyde, acetone, acetonitrile, carboxylic acids or mineral acids, without there being critical decreases in the yield or selectivity as a result in the polymerization. However it is expedient to avoid an accumulation of these impurities in the reactor by removing them from the isobutene feedstock beforehand, for example by means of adsorption onto solid adsorbents, such as active carbon, molecular sieves or ion exchangers.

The polymerization of the isobutene can be carried out batchwise, semibatchwise or continuously. Reactors known per se, such as tubular reactors, tube-bundle reactors or stirred kettles, can be employed for this purpose. The preparation process is preferably carried out in a loop reactor, i.e. a tubular reactor or tube-bundle reactor with continuous circulation of the reaction material, it being possible as a rule for the volume ratio of feed to circulation to be from 1:1 to 1:1000, preferably from 1:30 to 1:200. Of course, the amount of feedstocks introduced into the reactor corresponds to the amount of reaction discharge as soon as the polymerization reaction has reached an equilibrium state.

It is expedient to ensure thorough mixing of all reactants both when introducing preformed catalyst complexes into the reactor and during their in situ preparation in the reactor, since high local and steady-state catalyst concentrations in the reactor can give rise to undesirable double bond shifts in the polymeric products. Thorough mixing is achieved, for example, by suitable internals, such as baffle plates, or by adapted tube cross-sections which, in the case of a suitable flow rate, lead to an effective, expediently turbulent flow of the reaction material in the reactor.

The residence time of the isobutene in the reactor may be from 5 seconds to several hours. Preferably a residence time of from 1 to 30, particularly preferably from 2 to 20, minutes is chosen.

The polymerization is generally carried out at below 0° C. Although isobutene can be successfully polymerized even at substantially lower temperatures by means of the catalyst system to give highly reactive polyisobutene, preferably temperatures of from 0 to −60° C., in particular from 0 to −30° C., particularly preferably from −5 to −25° C., are employed.

Advantageously, the polymerization reaction is operated under isothermal conditions and, in the case of a continuous reaction, with establishment of a constant, steady-state isobutene concentration of the reaction medium. The steady-state isobutene concentration can in principle be chosen as desired. Expediently, an isobutene concentration of, as a rule, from 0.2 to 50, preferably from 0.2 to 10, % by weight, based on the total polymerization mixture, is established.

In general, the polymerization is carried out under atmospheric pressure or pressure slightly higher than atmospheric pressure. The use of superatmospheric pressure, in particular the autogenous pressure of the reaction system, may be advantageous from process engineering points of view with regard to the operation of the circulation pumps and downstream process stages but is generally not necessarily required for the result of the polymerization.

Since the polymerization reaction is exothermic, the resulting heat is removed as a rule with the aid of a cooling apparatus which can be operated, for example, with liquid ammonia as a coolant. Another possibility for removing the heat is by evaporative cooling, where the heat evolved is removed by vaporizing the isobutene, other readily volatile components of the isobutene feedstock and/or any readily volatile solvent, which may be ethane, propane or butane, with the result that the temperature remains constant.

The isobutene conversion can in principle be established as desired. However, the cost-efficiency of the process is of course questionable at very low isobutene conversions, whereas the danger of undesirable secondary reactions, for example of double shifts and especially of the formation of undesirable oligomers, becomes increasingly great at very high isobutene conversions of more than 99%. For these reasons, the isobutene conversion is as a rule from 20 to 99.5%, preferably from 90 to 99%. If it is intended to obtain polyisobutenes having high molar masses, the isobutene conversion is as a rule kept low, which generally leads to a high content of unconsumed isobutene in the reaction mixture.

In the discharge from the reactor (referred to below as discharge for short), the major part of the boron trifluoride used is as a rule present in free form or as a complex with the originally added complexing agent. However, it is not possible to rule out the possibility that a reaction of the boron trifluoride with other components of the reaction mixture has taken place, for example, with the use of isopropanol as a complexing agent, to give a borane. Owing to the usually small extent of such secondary reactions, however, they will not be considered further here, especially since the boranes formed with protic compounds are highly soluble in the organic phase and are very substantially destroyed in the aqueous washing of the polyisobutene. Rather, for the sake of simplicity and as a good approximation to the actual circumstances, it is to be assumed that all the boron trifluoride used is still intact as such at the time of the deactivation according to the invention.

The deactivation and recovery of the boron trifluoride can in principle be carried out batchwise, semibatchwise or continuously. Preferably, the deactivation and removal are carried out at from −30 to 0° C., in particular from −25 to −5° C. If the polymerization of the isobutene with boron trifluoride is carried out continuously, the boron trifluoride in the discharge is preferably deactivated continuously with the alkanols.

The alkanols can also be diluted, before the deactivation, with one or more further solvents inert under the reaction conditions and especially nonpolar, such as hydrocarbons or halogenated hydrocarbons, preferably those having a boiling point below 100° C., e.g. n-pentane, n-hexane, or dichloromethane. Such solvents can also be added to the discharge directly as such during the deactivation. In the mixtures with the inert solvents, the alkanols are generally present in an amount of from 5 to 100, preferably more than 20, % by weight.

The alkanols are used in a molar ratio of from 1:1 to 20:1, especially from 2:1 to 15:1, and in particular from 2:1 to 10:1, based on the boron trifluoride present in the discharge. For economic reasons, as far as possible only a small excess of the alkanols is used, but the greater the excess thereof or the better the mixing the more rapidly and completely the deactivation generally takes place. Since a rapid and complete deactivation of the boron trifluoride is an important precondition for ensuring that the product composition reached in the polymerization in the reactor no longer changes substantially by the end of the working-up, the use of a larger excess of alkanols may be advisable.

For the purpose of deactivating the boron trifluoride, the alkanols are introduced into the discharge and vigorously mixed with it, or they are initially taken and the discharge is added to them with vigorous mixing.

The resulting boron trifluoride complex is as a rule poorly soluble in the reaction medium and, at the temperature of the deactivation, usually forms a second phase which can be separated off in a simple manner and whose boron trifluoride content is in general greater than 10, preferably 20, especially 25, % by weight. Such a separation surprisingly also occurs at high residual contents of isobutene in the discharge of, in particular, more than 2% by weight, for example, in the preparation of polyisobutenes having an $M_n$ of from 1000 to 5000 Dalton.

In a further embodiment of the novel process, water can be added to the discharge for deactivating the boron trifluoride, in addition to the alkanol. The amount of water is up to 70, preferably up to 60, in particular from 5 to 50, % by weight, based on the alkanols, and, if required, mixtures thereof with solvents. Preferably, the water is not added until after the alkanols have first been allowed to act on the boron trifluoride in the discharge and after the mixture thus obtained—for example by means of a heat exchanger for recovering the cooling energy—has reached a temperature above the temperature at which the water in the mixture would freeze. This temperature is as a rule above 0° C.

In a further embodiment, alkanol and water are added together to the discharge.

Apparatuses which ensure rapid and complete mixing are preferably used in the deactivation of the boron trifluoride. For example, stirred kettles and preferably static mixers are used. Since hydrogen fluoride can form from boron trifluoride in the presence of, in particular, water, it may be necessary to avoid any contact of the reaction mixture with materials which are not resistant to hydrogen fluoride, such as glass or enamel.

The deactivation of the boron trifluoride is preferably carried out at the temperature of the polymerization, especially at from 0 to −30° C., in particular from 0 to −25° C. Deactivation at a temperature other than the reaction temperature is also possible; during the temperature increase or reduction required for this purpose, however, the reaction product may change in an undesirable manner as described above.

After the total amounts of the discharge, of the alkanol or, if required, of an alkanol/water mixture have been combined, the mixture obtained is usually kept thoroughly mixed for a further 10 seconds to 20 minutes using suitable apparatuses, for example with conventional mechanical stirrers and, in particular, by means of turbulent flow.

The formation of in particular two phases, one of which contains the main amount of the deactivated boron trifluoride (boron trifluoride/alkanol phase) and the other contains the main amount of the polyisobutene (organic phase), is particularly advantageous for the further working-up of the mixture thus obtained.

Such a phase separation can as a rule be substantially further improved in specific situations, for example at very high residual contents of isobutene in the discharge, if water is added to the discharge. The specific amount of water to be added can easily be determined by a few small-scale experiments by a person skilled in the art.

In addition to the main amount of the polyisobutene, the organic phase furthermore usually comprises the unconverted isobutene, low molecular weight polymers of isobutene, in particular having number average molecular weights below 300 Dalton, and, if required, the solvent.

Small residual amounts of boron trifluoride can be removed from the organic phase, if desired also by extraction, for example with methanol, or preferably by washing with water.

In the further course of the working-up, the organic phase is expediently separated by distillation into unconverted isobutene, any solvent, the low molecular weight polymers of isobutene and the desired product polyisobutene. The isobutene, the solvent and the low molecular weight polymers can be recycled to the polymerization independently of one another or together. The desired polyisobutene is as a rule taken up as a bottom product from the distillation column or a degassing tank.

The boron trifluoride/alkanol phase can be recycled as such to the reactor. It should be ensured that no undesirable dilution or viscosity reduction of the reactor content by the alkanol occurs. Moreover, the fact that methanol and ethanol may replace the alcohol which is part of the catalyst system should be taken into account. Corresponding concentration operations and, if desired, purification operations are as a rule therefore first preferably carried out on the boron trifluoride/alkanol phase before it is recycled to the process.

The concentration of the boron trifluoride in the phase separated off according to the invention can be effected in various ways. Thus, organic components, for example excess alkanols, can be distilled off by means of simple distillation from the boron trifluoride-containing phase separated off according to the invention. At first the boron trifluoride remains there in the bottom and, for example when the alkanol used is methanol, can be concentrated to more than 50% by weight.

Alternatively, the boron trifluoride/alkanol complex can be isolated, for example by freezing. $BF_3 \cdot 2$ MeOH has, for example, a freezing point of −20° C.

In another method for working up the boron trifluoride/alkanol phase, water is first added to said phase and then the organic components, such as methanol, ethanol, any solvent and organic components of the originally used catalyst complex, and any excess water are removed by means of distillation or steam stripping. In this way, a boron trifluoride concentration of more than 50% by weight can be achieved in the residue. The boron trifluoride/water phase thus obtained is usually virtually free of organic components and is thermally comparatively stable, which is advantageous for storage and transport thereof. Gaseous boron trifluoride of very high purity can therefore be liberated from it in a very simple manner known per se to a person skilled in the art, for example with the aid of oleum.

We have furthermore found that the presence of methyl tert-butyl ether (abbreviated to MTBE below) or, with the use of ethanol, also the presence of ethyl tert-butyl ether in the reaction mixture of the boron trifluoride-catalyzed preparation of polyisobutenes leads to an improved selectivity with respect to the terminal group character of the polyisobutenes prepared. As a rule, the terminal group character can be improved by up to 10% in this way. The amount of these ethers in the reaction mixture is in general from 20 to 5000, preferably from 30 to 3000, in particular from 40 to 2000, ppm (based on the total weight of the reaction mixture). If such an ether can also form in the reaction mixture, it is expedient to consider its initial concentration in the reaction zone, which can be derived in practice from its added amount, and its concentration in the discharge.

With the use of methanol as the alkanol in the context of the present invention, MTBE may form under specific conditions in the reaction mixture, on termination or at elevated temperatures in the heat exchanger. Investigations carried out have shown that the amount of MTBE formed in the preparation process for the polyisobutene is closely correlated with a molar methanol:boron trifluoride ratio under otherwise virtually comparable reaction conditions. Thus, at a molar ratio of from 0.3:1 to 20:1, and in particular from 15:1 to 1:1, MTBE formation takes place simultaneously with the deactivation of the catalyst complex, it being observed that the amount of MTBE formed per unit time decreases with increasing amount of ethanol.

We have also found that the formation of the MTBE in a reaction mixture in which in general tert-butyl cations and methanol form as intermediates and/or are present can also be controlled by the choice of the solvent, of the reaction temperature, of the residence time of the reaction mixture and the reaction zone and of the isobutene concentration there. This means that a person skilled in the art can routinely and readily establish the respective desired amount of MTBE by corresponding adaptation of the composition of the reaction mixture, of the procedure and of the apparatuses used—of course under the conditions of the polymerization process for isobutene.

During the working up of the discharge, MTBE or ethyl tert-butyl ether is then recycled in the desired amount to the process in a manner known per se, for example together with the catalyst complex or together with those reuseable components of the reaction mixture which have been separated off by distillation, such as isobutene, or together with the solvent.

By means of the novel process, the desired polyisobutenes can be prepared in higher yields and with higher vinylidene contents than by conventional processes of this type.

Because the hydrolysis of the boron trifluoride to hydrofluoric acid and derivatives of boric acid does not play any significant role in the novel procedure, corrosion of plant parts occurs only to a minor extent.

EXAMPLES

The number average molecular weights ($M_n$) of the polymers prepared according to the examples were determined by means of gel permeation chromatography, polyisobutenes having defined known values $M_n$ being used for the calibration. The chromatograms obtained were used to calculate $M_n$ according to the equation $$M_n = \frac{\sum C_i}{\sum \frac{C_i}{M_i}}$$

where $C_i$ is the concentration of an individual polymer species i in the polymer mixture obtained and $M_i$ is the molecular weight of this individual polymer species i.

The dispersity D was calculated from the ratio of weight average molecular weight ($M_w$) to number average molecular weight [lacuna] according to the equation $$D = \frac{M_w}{M_n}.$$

The weight average molecular weight $M_w$ required for this purpose was obtained from the resulting chromatograms with the aid of the formula $$M_w = \frac{\sum C_i M_i}{\sum C_i}.$$

The content of terminal vinylidene groups was determined with the aid of $^{13}$C-NMR spectroscopy, deuterated chloroform being used as the solvent and tetramethylsilane as the standard.

Example 1

Preparation of Highly Reactive Polyisobutene

For the preparation of a polyisobutene, the procedure according to EP-A 628 575, Example 1, was followed: the isobutene feedstock used was a $C_4$-cut having the following composition:

| | |
|---|---|
| isobutane | 4.0% by weight |
| n-butane | 9.2% by weight |
| 1-butene | 29.0% by weight |
| trans-2-butene | 7.7% by weight |
| cis-2-butene | 4.5% by weight |
| isobutene | 45.4% by weight |
| butadiene | <50 ppm |
| water | about 2 ppm |

In the course of one hour, 6000 g of the above $C_4$-cut were fed to the suction side of a loop reactor which was equipped with an integrated circulation pump and whose internal tube diameter was 4 mm and whose volume was 1000 ml. 1.6 times the molar amount of 2-butanol, based on the boron trifluoride, were added. The reactor was cooled so that the temperature in the reaction medium was −17° C. The average residence time of the reaction medium of the reactor was 6.6 minutes. Samples of the reactor content were taken via a sampling apparatus which was located 2 cm before the feed for the starting materials.

Examples 2 to 8

Continuous Deactivation and Removal of the Boron Trifluoride

Methanol was initially taken in a closable, pressure-resistant glass sampling bottle, and a 70 ml sample according to Example 1 was added in the course of a few seconds at −17° C. with thorough mixing. The mixture was heated from −17 to 20° C. in the closed glass sampling bottle in the course of 30 minutes while stirring by means of a magnetic stirrer. The stirrer was then switched off, after which droplets of a second phase were visible. The main amount of the boron trifluoride was present in the droplets (as the lower phase), which were separated off. The remaining organic phase was thoroughly mixed with 167 g of water for 60 minutes with stirring. After the aqueous phase had been separated off, the solvent was distilled off, and the analytical data listed in Table 1 were determined for the residue of the distillation.

TABLE 1

Further data for examples 2 to 8

| No. | $BF_3$ [mmol/l] | Methanol Amount [g] | Methanol Amount [mmol] | Water [g]* | C [%] | Y [%] | Vin [%] | $M_n$ | D |
|---|---|---|---|---|---|---|---|---|---|
| 2 | 7.1 | 1 | 31 | — | 94 | 93 | 85.6 | 2831 | 1.741 |
| 3 | 7.1 | 0.2 | 6.3 | — | 95 | 93 | 85.4 | 2844 | 1.788 |
| 4 | 7.1 | 0.1 | 3.1 | — | 94 | 93 | 86.0 | 2849 | 1.788 |
| 5 | 7.1 | 0.05 | 1.6 | — | 94 | 93 | 85.6 | 2855 | 1.793 |
| 6 | 7.1 | 0.02 | 0.6 | — | 94 | 93 | 85.2 | 2773 | 1.835 |
| 7 | 7.1 | 0.5 | 15.6 | 0.5 | 94 | 93 | 85.2 | 2793 | 1.729 |
| 8 | 7.1 | 0.3 | 9.4 | 0.7 | 94 | 93 | 85.4 | 2777 | 1.802 |

*Water was added simultaneously with the methanol

In table 1, the meanings are as follows:

$BF_3$ content of $BF_3$ in the sample: the amount of $BF_3$ added to the reaction was taken as a basis (see above)

C conversion in percent, based on isobutene used

Y yield of polyisobutene, based on isobutene used

Vin proportion of polyisobutene having vinylidene double bonds, based on the total polyisobutene yield $M_n$ number average molecular weight (determined by gel permeation chromatography)

D dispersity

Examples 9 to 13

Continuous Deactivation and Removal of the Boron Trifluoride

An isobutene feedstock having the following composition was polymerized according to Example 1:

| | |
|---|---|
| isobutane, | <1% by weight |
| n-butane, | |
| 1-butene, | |
| trans-2-butene and | |
| cis-2-butene together | |
| 1-butene | <1% by weight |
| trans-2-butene | <1% by weight |
| cis-2-butene | <1% by weight |
| isobutene | 45% by weight |
| butadiene | <50 ppm |
| water | about 2 ppm |
| n-hexane | remainder to 100% by weight. |

However, in contrast to Example 1, 1.6 times the molar amount of 2-propanol, based on the boron trifluoride, were added and the reactor was cooled so that the temperature in the reaction medium was −19° C. The reactor discharge was passed through a tube which was cooled to −18° C. and to which methanol was added continuously by means of a static mixing apparatus (nozzle). No temperature increase was observed. In a downstream dwell tank cooled to −17° C. and having a volume of 400 ml, the reactor discharge treated in this manner was separated into two phases, the lower of which contained the predominant part of the boron trifluoride. This lower phase was separated off and the content of boron trifluoride (boron trifluoride recovery) was determined. It was from 43 to 73% by weight in the individual samples brought to room temperature. Further data on experiments 9 to 13 are to be found in Table 2 below.

TABLE 2

Further data on Examples 9 to 13

| | | | Methanol | | $BF_3$ recovery in the lower phase [g/h] | MTBE content in the discharge [ppm | | | | | |
|---|---|---|---|---|---|---|---|---|---|---|---|
| N. | $BF_3$ [mmol/h] | $BF_3$ [g/h] | Amount [g/l] | Amount [mmol/l] | ([% of amount used]) | of the total weight of the discharge] | U [%] | A [%] | Vin [%] | $M_n$ | D |
| 9 | 53.3 | 3.61 | 20 | 625 | 2.64 (73) | <20 | 95 | 94 | 80.7 | 2675 | 1.715 |
| 10 | 53.3 | 3.61 | 10 | 313 | 2.56 (71) | <20 | 95 | 94 | 81.3 | 2651 | 1.729 |
| 11 | 53.3 | 3.61 | 7.5 | 234 | 2.64 (73) | 27 | 95 | 94 | 83.9 | 2649 | 1.738 |
| 12 | 53.3 | 3.61 | 5 | 156 | 2.31 (64) | 97 | 95 | 93 | 87.3 | 2655 | 1.793 |
| 13 | 53.3 | 3.61 | 2.5 | 78 | 1.55 (43) | 183 | 95 | 93 | 89.7 | 2473 | 1.835 |

For the meanings of the abbreviations used, cf. Table 1

Example 14

Recycling of the Lower Phase from Example 11 to the reactor

The experimental procedure of Example 11 was modified in such a way that 3 g per hour of 8.7 g of the lower, boron trifluoride-rich phase (boron trifluoride content 33% by weight) separated off in the same period were recycled continuously to the reactor. On the other hand, the amount of fresh boron trifluoride added was reduced from 53.3 to 38.6 mmol/h, i.e. by 1 g/h. The molar 2-propanol:$BF_3$ ratio in the reactor was furthermore brought to 0.5. The reaction and the polyisobutene obtained were characterized by:

| | |
|---|---|
| C | 96% |
| Y | 94% |
| Vin | 86.9% |

| | |
|---|---|
| $M_n$ | 1987 |
| D | 1.698 |

(The abbreviations are explained in Table 1.)

(The abbreviations are explained in Table 1.)

Example 15

Working-Up of the Lower Phase of Example 11 by distillation 50 ml of the lower phase (boron trifluoride content 33% by weight) obtained according to Example 11 were introduced into a distillation apparatus which consisted of a 100 ml three-necked flask having a water-cooled distillation bridge and provided with thermometer and stirrer. The flask was heated from the outside by means of a heating jacket. The content of the flask began to boil at 62° C. under atmospheric pressure. The boiling point of the distillate passing over increased continuously to 105° C. Above 105° C., slight mist formation occurred. The distillation was then stopped. For the 28 ml (22.1 g) of distillate, analysis gave a boron trifluoride content of 1.4% by weight; the residue (22 ml, 27.0 g) had a boron trifluoride content of 59.4% by weight.

Example 16

Working-Up of the Lower Phase of Example 11 by distillation with Addition of Water The distillation according to Example 15 was repeated but 15 ml of water were added dropwise beforehand to the reactor discharge, the content of the distillation flask heating up. The content of the flask began to boil at 62° C. under atmospheric pressure. The boiling point of the distillate passing over increased continuously to 118° C. Above 118° C., slight mist formation occurred. The distillation was then stopped. For the 40 ml (34.8 g) of distillate, the analysis gave a boron trifluoride content of 1.9% by weight; the residue (23 ml, 29.3 g) had a boron trifluoride content of 60.3% by weight and an organic carbon content (TOC) of 237 ppm by weight.

We claim:

1. A process for deactivating and recovering boron trifluoride in the preparation of polyisobutenes by cationic polymerization of isobutene or isobutene-containing hydrocarbon streams in the liquid phase in the presence of boron trifluoride as such or in the form of a boron trifluoride catalyst complex in a reactor, the catalyst complex separating as a substantially liquid phase from the material discharged from the reactor, comprising:

a) adding methanol, ethanol or a mixture of methanol and ethanol to the material discharged from the polymerization reactor at a temperature from −60 to 0°C. in an amount which results in the formation of a boron trifluoride-rich alcohol phase;

b) separating the alcohol phase containing boron trifluoride from the material discharged from the reactor; and c) optionally recycling the boron trifluoride of the alcohol phase obtained from (b) to the process in a suitable manner.

2. The process as claimed in claim 1, wherein methanol is the alcohol added to process step (a).

3. The process as claimed in claim 1, wherein the formation of the boron trifluoride-rich alcohol phase in process step (a) is facilitated by adding water to the material discharged from the polymerization reactor.

4. The process as claimed in claim 1, wherein the polyisobutene is a highly active polyisobutene having from 80 to 100 mol % of terminal double bonds.

5. The process as claimed in claim 1, wherein the highly active polyisobutene has a number average molecular weight Mn ranging from 200 to 50000 Dalton.

6. The process as claimed in claim 1, wherein the cationic polymerization is conducted with a catalyst system which contains isopropanol.

7. The process as claimed in claim 1, wherein the cationic polymerization is conducted with a catalyst system which contains methanol.

8. The process as claimed in claim 6, wherein the cationic polymerization is conducted with a catalyst system which further comprises a dialkyl ether having at least one secondary alkyl group.

9. The process as claimed in claim 1, wherein the deactivation and recovery of the boron trifluoride are conducted continuously.

10. The process as claimed in claim 1, wherein the polymerization of isobutene is conducted in the presence of from 20 to 5000 ppm of methyl tert-butyl ether, based on the weight of the reaction mixture.

11. The process as claimed in claim 10, in which the methyl tert-butyl ether is formed at least partially in the process.

12. The process as claimed in claim 10, wherein the methyl tert-butyl ether in the material discharged from the reactor is separated and is partially or fully recycled to the process.

13. The process as claimed in claim 7, wherein the cationic polymerization is conducted with a catalyst system which further comprises a dialkyl ether having at least one secondary alkyl group.

14. The process as claimed in claim 12, wherein the methyl tert-butyl ether in the material discharged from the reactor is separated and is partially or fully recycled to the process.

15. The process as claimed in claim 1, wherein the boron trifluoride catalyst is a complex of boron trifluoride with an alcohol or a dialkyl ether that has at least one tert-alkyl group, in a molar ratio of complexing agent to boron trifluoride of 2.5 to 1.05:1.

16. The process as claimed in claim 15, wherein the boron trifluoride catalyst is a complex of boron trifluoride with an alcohol or a dialkyl ether that has at least one tert-alkyl group, in a molar ratio of complexing agent to boron trifluoride of 2 to 1.25:1.

17. The process as claimed in claim 15, wherein the polymerization reaction is conducted in the reactor at a residence time of from 5 seconds to several hours at a temperature ranging from 0 to −30°C.

18. The process as claimed in claim 17, wherein the polymerization reaction is conducted in the reactor at a residence time of from 1 to 30 minutes at a temperature ranging from −5 to −25°C.

* * * * *